United States Patent
Garg et al.

(10) Patent No.: US 11,410,020 B2
(45) Date of Patent: Aug. 9, 2022

(54) MACHINE LEARNING MODELS FOR PREDICTING TIME IN TRAFFIC

(71) Applicants: Geet Garg, Bengaluru (IN); Vittal Sai Prasad Sirigiri, Bengaluru (IN); Farhat Abbas Habib, Bengaluru (IN)

(72) Inventors: Geet Garg, Bengaluru (IN); Vittal Sai Prasad Sirigiri, Bengaluru (IN); Farhat Abbas Habib, Bengaluru (IN)

( * ) Notice: Subject to any disclaimer, the term of this patent is extended or adjusted under 35 U.S.C. 154(b) by 400 days.

(21) Appl. No.: 16/504,311

(22) Filed: Jul. 7, 2019

(65) Prior Publication Data
US 2020/0160148 A1 May 21, 2020

Related U.S. Application Data

(60) Provisional application No. 62/694,615, filed on Jul. 6, 2018.

(51) Int. Cl.
| | | |
|---|---|---|
| *G06N 3/04* | (2006.01) | |
| *G06N 5/00* | (2006.01) | |
| *G06N 99/00* | (2019.01) | |
| *G06N 3/08* | (2006.01) | |

(52) U.S. Cl.
CPC ............ *G06N 3/0427* (2013.01); *G06N 3/08* (2013.01); *G06N 5/003* (2013.01); *G06N 99/00* (2013.01)

(58) Field of Classification Search
CPC   G06N 3/02; G06N 3/08; G06N 5/003; G06N 20/00; G06N 99/00
See application file for complete search history.

(56) References Cited

U.S. PATENT DOCUMENTS

| | | | | |
|---|---|---|---|---|
| 9,177,473 | B2* | 11/2015 | Min | G08G 1/123 |
| 10,127,496 | B1* | 11/2018 | Fu | G01C 21/3484 |
| 10,816,351 | B1* | 10/2020 | Yao | G01C 21/3492 |
| 11,085,792 | B2* | 8/2021 | Zhong | G06Q 50/30 |
| 2016/0202074 | A1* | 7/2016 | Woodard | G01C 21/34 |
| | | | | 701/465 |

OTHER PUBLICATIONS

Wang, Dong, et al. "When will you arrive? estimating travel time based on deep neural networks." Thirty-Second AAAI Conference on Artificial Intelligence. Apr. 26, 2018. (Year: 2018).*
Zhang, Hanyuan, et al. "Deeptravel: a neural network based travel time estimation model with auxiliary supervision." arXiv preprint arXiv:1802.02147. Feb. 6, 2018. (Year: 2018).*
Hamner, Benjamin. "Predicting travel times with context-dependent random forests by modeling local and aggregate traffic flow." 2010 IEEE International Conference on Data Mining Workshops. IEEE, 2010. (Year: 2010).*

* cited by examiner

*Primary Examiner* — Benjamin P Geib

(57) ABSTRACT

In one aspect, a computerized method for using machine learning methods for modeling for time in traffic for a vehicle on a delivery route includes the step of collecting a set of traffic feature values from a database. The method includes the step of normalizing the set of traffic feature values. The method includes the step of providing a machine learning model. The method includes the step of inputting the set of normalized traffic features into the machine learning model. The method includes the step of training the machine learning model with the set of normalized traffic features. The method includes the step of determining a target time for the vehicle on the delivery route.

2 Claims, 6 Drawing Sheets

MACHINE LEARNING MODELS FOR PREDICTING TIME IN TRAFFIC

CROSS-REFERENCE TO RELATED APPLICATIONS

This application claims priority from U.S. provisional patent application no. 62/694,615, titled MACHINE LEARNING MODELS FOR PREDICTING TIME IN TRAFFIC and filed on 6 Jul. 2018. This application is hereby incorporated by reference in its entirety.

BACKGROUND

1. Field

This application relates generally to machine learning, and more particularly to a system, method and article of manufacture of machine learning models for predicting time in traffic.

2. Related Art

For routing purposes, it is important to know the amount of time taken in traffic between two points. This can be conventionally done by looking at the average time taken by a large number of vehicles at a given point in time for two (2) points if tracking a sufficiently large number of vehicles is possible. Traffic usually follows predictable patterns for higher time in traffic during morning and evening rush and lower times at night. Additionally, there are patterns pertaining to weekday and weekend traffic. Machine learning can be applied to improve these methods.

BRIEF SUMMARY OF THE INVENTION

In one aspect, a computerized method for using machine learning methods for modeling for time in traffic for a vehicle on a delivery route includes the step of collecting a set of traffic feature values from a database. The method includes the step of normalizing the set of traffic feature values. The method includes the step of providing a machine learning model. The method includes the step of inputting the set of normalized traffic features into the machine learning model. The method includes the step of training the machine learning model with the set of normalized traffic features. The method includes the step of determining a target time for the vehicle on the delivery route.

Figure 1:
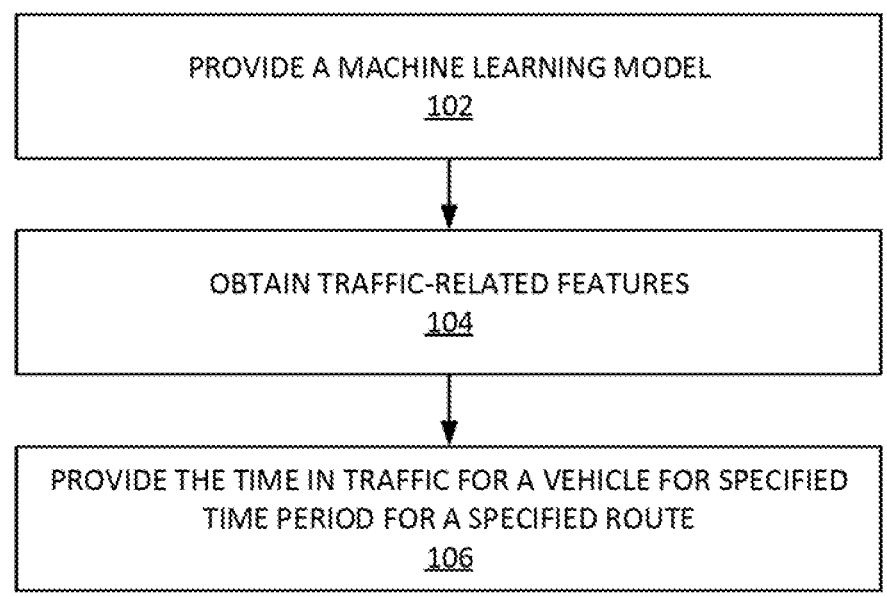
FIG. 1 illustrates an example process for machine learning models for predicting time in traffic, according to some embodiments.
Figure 1:

The Figures described above are a representative set and are not an exhaustive with respect to embodying the invention.

DESCRIPTION

Disclosed are a system, method, and article of manufacture of machine learning models for predicting time in traffic. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Deep learning is a family of machine learning methods based on learning data representations. Learning can be supervised, semi-supervised or unsupervised.

Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

Random forests (RF) (e.g. random decision forests) are an ensemble learning method for classification, regression and other tasks, that operate by constructing a multitude of decision trees at training time and outputting the class that is the mode of the classes (e.g. classification) or mean prediction (e.g. regression) of the individual trees. RFs can correct for decision trees' habit of overfitting to their training set.

Example Methods

FIG. 1 illustrates an example process 100 for machine learning models for predicting time in traffic, according to some embodiments. In step 102, process 100 can provide a machine learning model. In step 104, process 100 can obtain traffic-related features. The features used can include: road distance, air distance, weekday, average speed and hour of day. In step 106, process 100 can provide the time in traffic for a vehicle for specified time period for a specified route.

Figure 2:
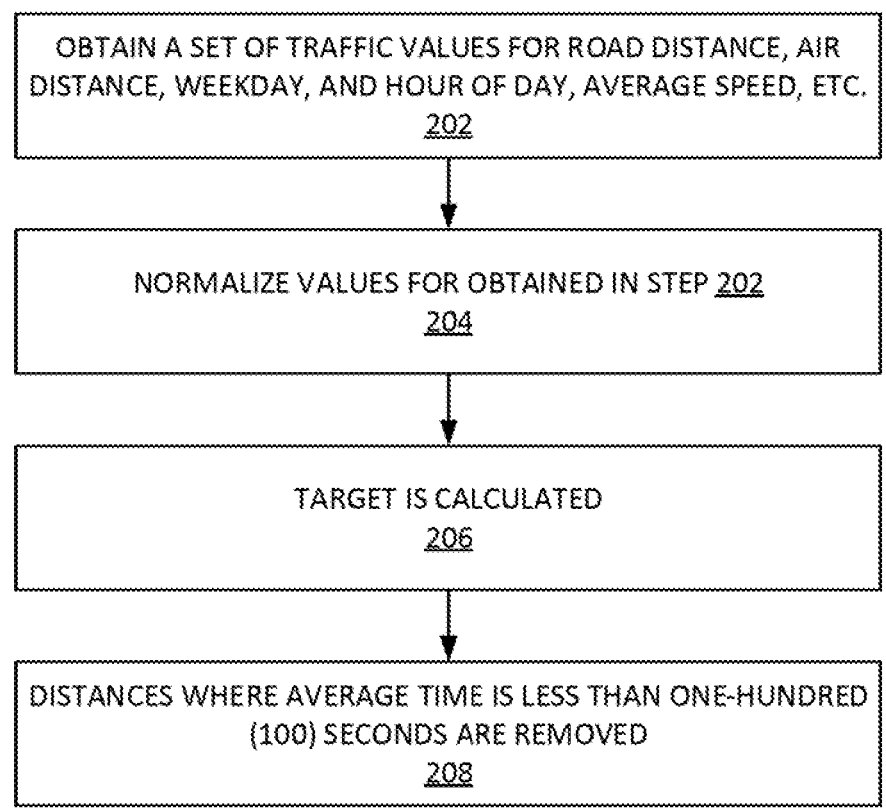
FIG. 2 illustrates an example process for using machine learning methods for modeling for time in traffic, according to some embodiments.

Two example machine learning methods for modeling for time in traffic are now discussed. FIG. 2 illustrates an example process 200 for using machine learning methods for modeling for time in traffic, according to some embodiments. In step 202, process 200 can obtain a set of traffic values for the following, inter alia: road distance, air distance, weekday, hour of day, average speed, etc. In step 204, process 200 can normalize said values. For example, these values can be normalized to approximately lie between −1 and 1. This can enable better training as raw features have extremely different ranges. Additionally, average speed, computed as road distance divided by average time and normalized to lie between −1 and +1 is also a feature.

In step 206, the target can be calculated. The target is normalized time, which is the fractional deviation of the time in traffic from the average time.

$$t\_norm = (t\_traffic - t\_average)/t\_average \times 4$$

Where t_norm is the normalized time, t_traffic is the time in traffic, t_average is the average time. The factor of 4 is applied to make it lie approximately between −1 and 1. Weekdays are taken as a one-hot feature, and time of day (in GMT) is also converted to lie between −1 and 1. The number of features can be kept simple and few to have the model generalizable and applicable to novel geographies.

In step 208, the distances where average time is less than one-hundred (100) seconds are removed. This can be because over very short distances variances in relative traffic time are high and other delays would impact travel time more than traffic.

Figure 3:
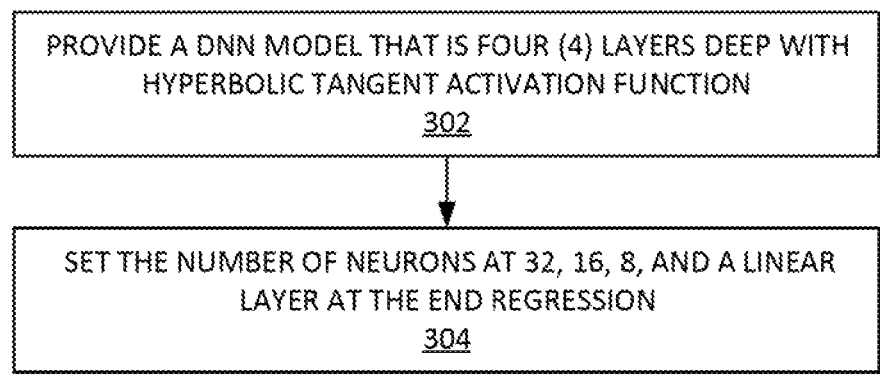
FIG. 3 illustrates an example process for implementing a Deep Neural Network (DNN) model to generate traffic models, according to some embodiments.

FIG. 3 illustrates an example process 300 for implementing a Deep Neural Network (DNN) model to generate traffic models, according to some embodiments. In step 302, process 300 can provide a DNN model that is four (4) layers deep with hyperbolic tangent activation function. In step 304, process 300 can set the number of neurons at 32, 16, 8, and a linear layer at the end regression. In step 306, process 300 can train the DNN model with a five (5) fold cross validation with mean squared error as the loss function.

Figure 4:
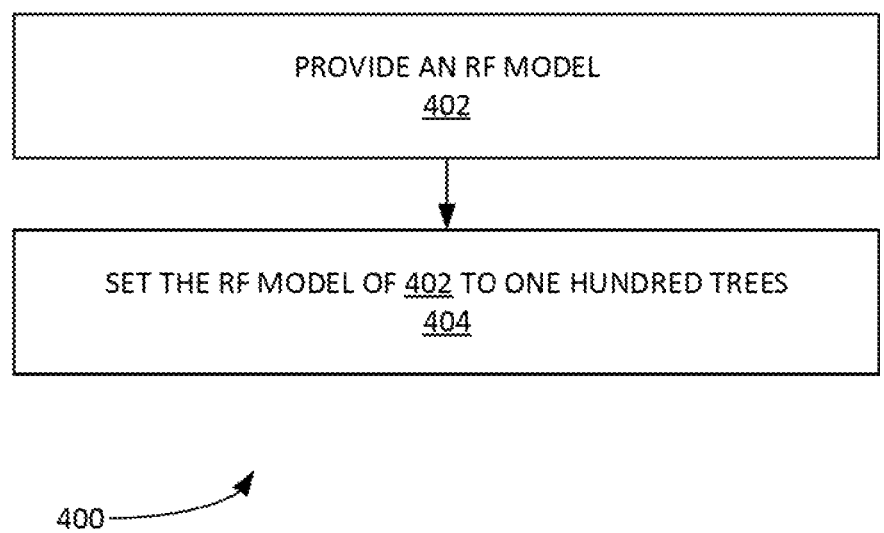
FIG. 4 illustrates an example process for implementing a RF model for traffic modelling, according to some embodiments.

FIG. 4 illustrates an example process 400 for implementing a RF model for traffic modelling, according to some embodiments. In step 402, process 400 provides an alternative RF model. The RF mode can be implemented over the same data as with the above processes. RFs are an ensemble model that work particularly well for this kind of prediction and are resistant to overfitting. In step 404, the RF model with can be set with one-hundred (100) trees.

Example Computing Systems

Figure 5:
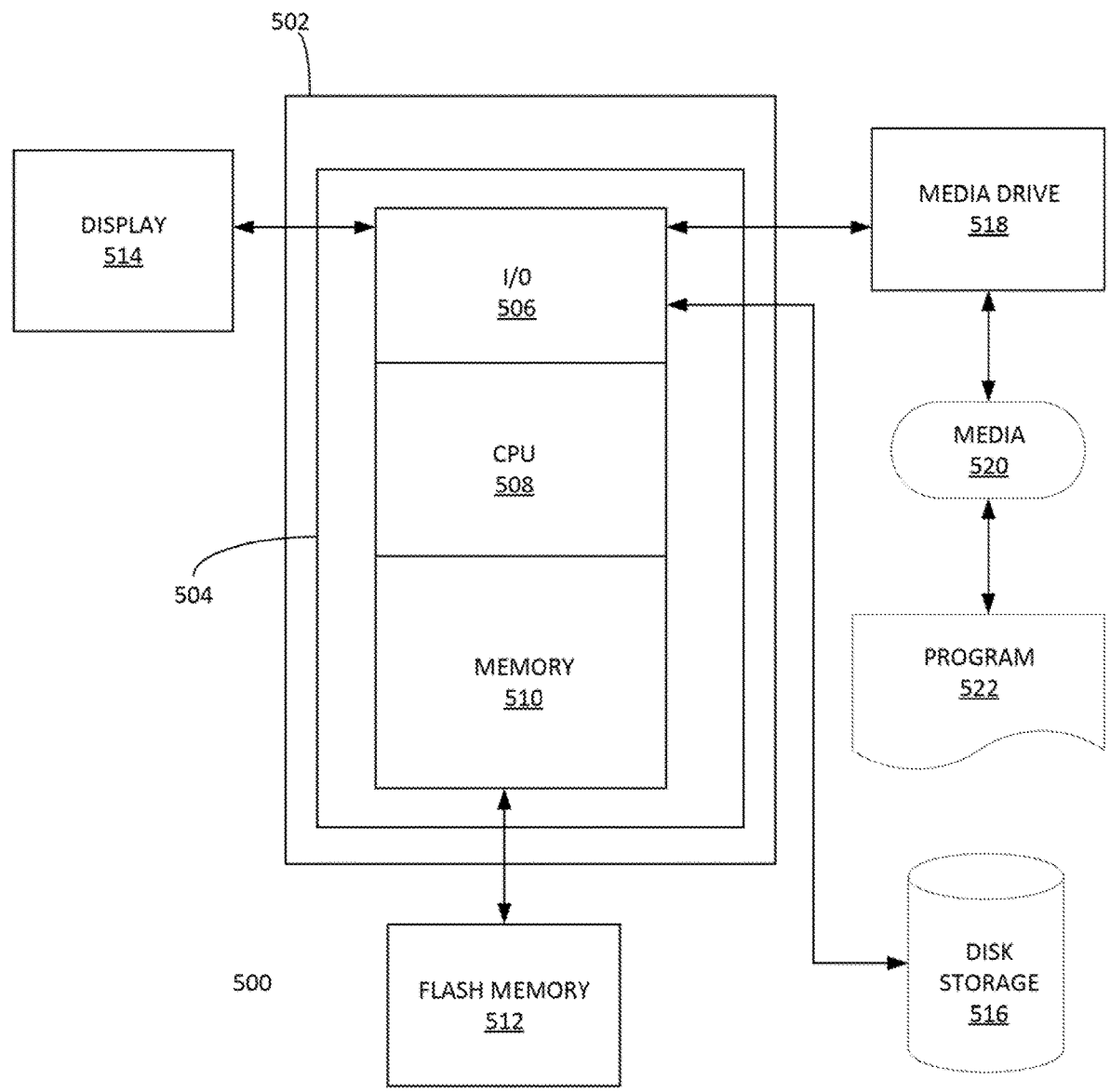
FIG. 5 depicts an exemplary computing system that can be configured to perform any one of the processes provided herein.

FIG. 5 depicts an exemplary computing system 500 that can be configured to perform any one of the processes provided herein. In this context, computing system 500 may include, for example, a processor, memory, storage, and I/O devices (e.g., monitor, keyboard, disk drive, Internet connection, etc.). However, computing system 500 may include circuitry or other specialized hardware for carrying out some or all aspects of the processes. In some operational settings, computing system 500 may be configured as a system that includes one or more units, each of which is configured to carry out some aspects of the processes either in software, hardware, or some combination thereof.

FIG. 5 depicts computing system 500 with a number of components that may be used to perform any of the processes described herein. The main system 502 includes a motherboard 504 having an I/O section 506, one or more central processing units (CPU) 508, and a memory section 510, which may have a flash memory card 512 related to it. The I/O section 506 can be connected to a display 514, a keyboard and/or other user input (not shown), a disk storage unit 516, and a media drive unit 518. The media drive unit 518 can read/write a computer-readable medium 520, which can contain programs 522 and/or data. Computing system 500 can include a web browser. Moreover, it is noted that computing system 500 can be configured to include additional systems in order to fulfill various functionalities. Computing system 500 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 6:
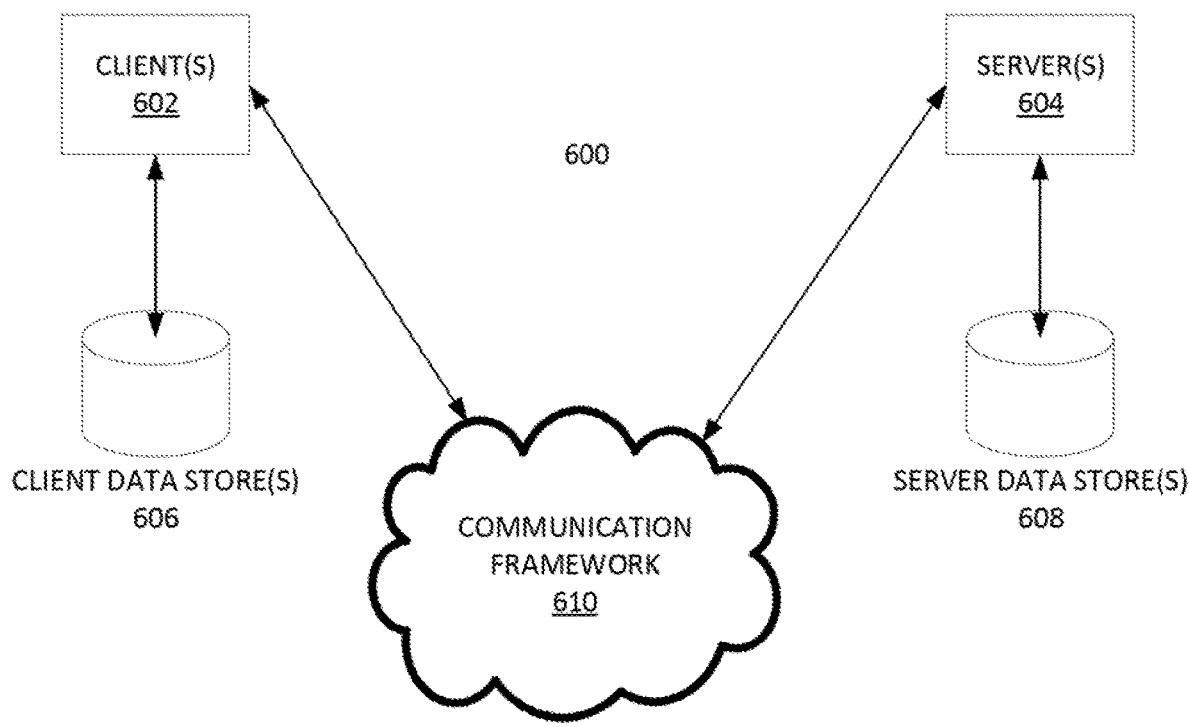
FIG. 6 is a block diagram of a sample computing environment that can be utilized to implement various embodiments.

FIG. 6 is a block diagram of a sample computing environment 600 that can be utilized to implement various embodiments. The system 600 further illustrates a system that includes one or more client(s) 602. The client(s) 602 can be hardware and/or software (e.g., threads, processes, computing devices). The system 600 also includes one or more server(s) 604. The server(s) 604 can also be hardware and/or software (e.g., threads, processes, computing devices). One possible communication between a client 602 and a server 604 may be in the form of a data packet adapted to be transmitted between two or more computer processes. The system 600 includes an orchestration framework 610 that can be employed to facilitate communications between the client(s) 602 and the server(s) 604. The client(s) 602 are connected to one or more client data store(s) 606 that can be employed to store information local to the client(s) 602. Similarly, the server(s) 604 are connected to one or more server data store(s) 608 that can be employed to store information local to the server(s) 604. In some embodiments, system 600 can instead be a collection of remote computing services constituting a cloud-computing platform.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed is:

1. A computerized method for using machine learning methods for modeling for time in traffic for a vehicle on a delivery route comprising:
    collecting a set of traffic feature values from a database;
    normalizing the set of traffic feature values;
    providing a machine learning model;
    inputting the set of normalized traffic features into the machine learning model;
    training the machine learning model with the set of normalized traffic features;
    determining a target time for the vehicle on the delivery route;
    removing distances where the average historical time is less than one hundred (100) seconds, wherein the machine learning model comprises a deep neural network (DNN) model;
    training the DNN model with a five (5) fold cross validation with a mean squared error as a loss function, wherein the machine learning model comprises a random forest (RF) model,
    wherein the set of traffic feature values comprises a road distance, an air distance, a weekday, and an hour of day,
    wherein the set of normalizing the set of traffic feature values are normalized to lie with a range of negative one (−1) and to positive one (+1),
    wherein the set of traffic feature values comprises an average speed computed as the road distance divided by an average historical time to travel the road distance,
    wherein the average speed is normalized to lie with the range of negative one (−1) and to positive one (+1),
    wherein the target time comprises a normalized time that is a fractional deviation of a time in traffic time from the average historical time,
    wherein the DNN model is four (4) layers deep with hyperbolic tangent activation function, and
    wherein a set the number of neurons of the DNN are set at 32, 16, 8, and a linear layer at an end regression.

2. The computerized method of claim 1 wherein the RF model comprises an ensemble model that is set with RF one hundred (100) trees.

* * * * *